US012229965B2

(12) United States Patent
Kim et al.

(10) Patent No.: US 12,229,965 B2
(45) Date of Patent: Feb. 18, 2025

(54) IMAGE SEGMENTATION METHOD AND DEVICE

(71) Applicant: SAMSUNG ELECTRONICS CO., LTD., Suwon-si (KR)

(72) Inventors: Suji Kim, Suwon-si (KR); Seungjun Shin, Hwaseong-si (KR); Dokwan Oh, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 508 days.

(21) Appl. No.: 17/578,639

(22) Filed: Jan. 19, 2022

(65) Prior Publication Data

US 2023/0031919 A1  Feb. 2, 2023

(30) Foreign Application Priority Data

Jul. 29, 2021 (KR) .................. 10-2021-0099964
Aug. 20, 2021 (KR) .................. 10-2021-0110297

(51) Int. Cl.
*G06T 7/11* (2017.01)
*B60K 35/28* (2024.01)
(Continued)

(52) U.S. Cl.
CPC ................ *G06T 7/11* (2017.01); *B60K 37/00* (2013.01); *B60W 10/04* (2013.01); *B60W 10/20* (2013.01);
(Continued)

(58) Field of Classification Search
CPC ........... G06T 7/11; B60K 37/00; B60K 35/28; B60K 2360/177; B60W 10/04; B60W 10/20; B60W 2420/403; B60W 2510/0652; B60W 2510/20; G06V 10/764; G06V 10/771; G06V 10/774; G06V 10/82; G06V 20/58; G06V 20/13; G06V 20/41; G06V 20/00
See application file for complete search history.

(56) References Cited

U.S. PATENT DOCUMENTS

| 10,540,572 B1 | 1/2020 | Kim et al. |
| 2003/0147558 A1* | 8/2003 | Loui ................. G06F 18/254 |
| | | 382/228 |

(Continued)

FOREIGN PATENT DOCUMENTS

| CN | 110909820 A | 3/2020 |
| KR | 10-2071179 B1 | 1/2020 |
| KR | 10-2021-0048058 A | 5/2021 |

OTHER PUBLICATIONS

Michieli, Umberto, et al., "Incremental Learning Techniques for Semantic Segmentation", Proceedings of the IEEE/CVF International Conference on Computer Vision Workshops, 2019 (8 pages in English).

(Continued)

*Primary Examiner* — Wassim Mahrouka
(74) *Attorney, Agent, or Firm* — NSIP Law

(57) ABSTRACT

An electronic device extracts feature data from an input image, calculates one or more class maps from the feature data using a classifier layer, calculates one or more cluster maps from the feature data using a clustering layer, and generates image segmentation data using the one or more class maps and the one or more cluster maps.

23 Claims, 7 Drawing Sheets

(51) Int. Cl.
   *B60K 37/00*      (2024.01)
   *B60W 10/04*      (2006.01)
   *B60W 10/20*      (2006.01)
   *G06V 10/764*     (2022.01)
   *G06V 10/771*     (2022.01)
   *G06V 10/774*     (2022.01)
   *G06V 10/82*      (2022.01)
   *G06V 20/58*      (2022.01)

(52) U.S. Cl.
   CPC .......... *G06V 10/764* (2022.01); *G06V 10/771* (2022.01); *G06V 10/774* (2022.01); *G06V 10/82* (2022.01); *G06V 20/58* (2022.01); *B60K 35/28* (2024.01); *B60K 2360/177* (2024.01); *B60W 2420/403* (2013.01); *B60W 2510/0652* (2013.01); *B60W 2510/20* (2013.01)

(56) References Cited

U.S. PATENT DOCUMENTS

| | | | |
|---|---|---|---|
| 2018/0130207 A1* | 5/2018 | Anderson | G06V 20/698 |
| 2018/0173973 A1* | 6/2018 | Hattori | G06F 18/24 |
| 2020/0042878 A1* | 2/2020 | Mixter | G06N 3/047 |
| 2020/0410254 A1 | 12/2020 | Pham et al. | |

OTHER PUBLICATIONS

Cermelli, Fabio, et al., "Modeling the Background for Incremental Learning in Semantic Segmentation", Proceedings of the IEEE/CVF Conference on Computer Vision and Pattern Recognition, 2020 (10 pages in English).

He, Jiangpeng, et al., "Unsupervised Continual Learning Via Pseudo Labels", arXiv preprint arXiv:2104.07164, 2021 (10 pages in English).

Coletta, Luiz FS, et al. "Combining clustering and active learning for the detection and learning of new image classes." Neurocomputing 358 (2019): 150-165.

Extended European search report issued on Oct. 7, 2022, in counterpart European Patent Application No. 22167519.2 (9 pages in English).

* cited by examiner

IMAGE SEGMENTATION METHOD AND DEVICE

CROSS-REFERENCE TO RELATED APPLICATIONS

This application claims the benefit under 35 USC § 119(a) of Korean Patent Application No. 10-2021-0099964 filed on Jul. 29, 2021, and Korean Patent Application No. 10-2021-0110297 filed on Aug. 20, 2021, in the Korean Intellectual Property Office, the entire disclosures of which are incorporated herein by reference for all purposes.

BACKGROUND

1. Field

The following description relates to image segmentation.

2. Description of Related Art

Scene segmentation may be a process of recognizing a natural scene and understanding a content of the scene. A human being may recognize a scene with eyes and identify outstanding aspects (e.g., landmarks or people in front of a tourist attraction). In computer vision, scene classification may include capturing one or more images in the scene using a camera and identifying an element of the scene. Semantic segmentation may be a process of identifying a portion or region of an image corresponding to an object (e.g., a person, a building, a tree) of a certain class.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes an image acquirer configured to obtain an input image, and a processor configured to extract feature data from the input image based on a feature extraction layer, calculate one or more class maps from the feature data based on a classifier layer, calculate one or more cluster maps from the feature data based on a clustering layer, and generate image segmentation data based on the one or more class maps and the one or more cluster maps.

The processor may generate the one or more class maps, the one or more cluster maps, and the image segmentation data to have a resolution of the input image.

The processor may determine a pixel classified into a background class in the one or more class maps as being comprised in a cluster corresponding to one of the one or more cluster maps.

The processor may exclude a clustering result that is based on the one or more cluster maps, for a pixel labeled based on the one or more class maps among pixels of the image segmentation data.

The processor may select the classifier layer from among a plurality of classifier layers based on a position of the electronic device.

In a case in which a complexity of a surrounding environment increases due to a change in the position of the electronic device while calculating the one or more class maps using a first classifier layer having a first number of available classes, the processor may select a second classifier layer having a second number of available classes that is greater than the first number of available classes.

In a case in which the complexity of the surrounding environment decreases due to a change in the position of the electronic device while calculating the one or more class maps using a second classifier layer having the second number of available classes, the processor may select a first classifier layer having the first number of available classes that is less than the second number of available classes.

The processor may select the clustering layer from among a plurality of clustering layers based on a position of the electronic device.

In a case in which the complexity of the surrounding environment increases due to a change in the position of the electronic device while calculating the one or more cluster maps using a first clustering layer having a first number of available clusters, the processor may select a second clustering layer having a second number of available clusters that is greater than the first number of available clusters.

In a case in which the complexity of the surrounding environment decreases due to a change in the position of the electronic device while calculating the one or more cluster maps using a second clustering layer having the second number of available clusters, the processor may select a first clustering layer having the first number of available clusters that is less than the second number of available clusters.

The processor may update one of or a combination of two or more of the feature extraction layer, the classifier layer, and the clustering layer, based on training data collected during a movement of the electronic device.

The processor may update a parameter of the classifier layer based on a loss between a ground truth label of the collected training data and the one or more class maps calculated from the classifier layer.

The processor may update a parameter of the clustering layer using a loss calculated based on a training image of the training data and an image augmented from the training image.

The processor may train a previously constructed classifier layer and a new classifier layer including a layer corresponding to a class to be added, based on the training data.

The processor may obtain a clustering result corresponding to the class to be added from one or more cluster maps calculated by a previously constructed clustering layer, and update a parameter of the new classifier layer based on a loss between the obtained clustering result and a class map calculated using the new classifier layer.

The electronic device may be provided in a vehicle. In this case, the image acquirer may obtain an image of a surrounding scene around the vehicle while the vehicle is traveling, and the processor may generate information associated with the traveling of the vehicle using the image segmentation data and visually display the information associated with the traveling through a display.

The processor may perform one of or a combination of two or more of speed control, acceleration control, and steering control of the vehicle while the vehicle is traveling, using the image segmentation data.

The electronic device may be provided in an augmented reality (AR) providing device. In this case, the processor may generate an AR content using the image segmentation data and visually provide the AR content to a user through an AR display.

In another general aspect, a processor-implemented method includes extracting feature data from an input image based on a feature extraction layer, calculating one or more class maps from the extracted feature data based on a classifier layer, calculating one or more clustering maps from the extracted feature data based on a clustering layer, and generating image segmentation data based on the one or more class maps and the one or more cluster maps.

In another general aspect, an electronic device includes one or more processors configured to: obtain input data; extract feature data from the input data based on a feature extraction layer; select a classifier layer and a clustering layer based on a physical location of the electronic device; generate one or more class maps from the feature data based on the classifier layer; generate one or more cluster maps from the feature data based on the clustering layer; and generate segmentation data related to the input data based on the one or more class maps and the one or more cluster maps.

The input data may be image data related to a surrounding of the electronic device.

The one or more processors may be configured to generate the one or more class maps and the one or more cluster maps using a machine learning model.

The machine learning model may include a neural network.

Other features and aspects will be apparent from the following detailed description, the drawings, and the claims.

Figure 1:
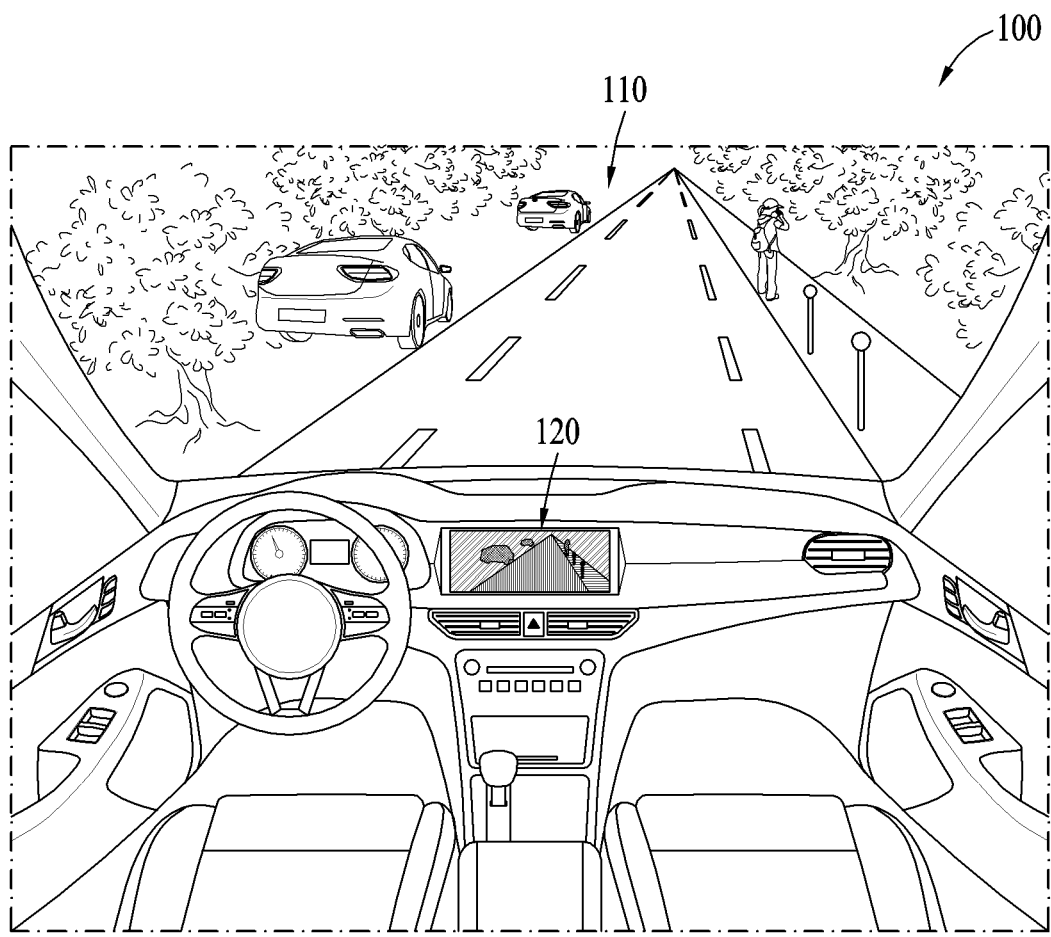
FIG. 1 illustrates an example of image segmentation of an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of image segmentation of an electronic device.

Referring to FIG. 1, an electronic device 100 of an example may generate image segmentation data 120 in which an input image is segmented by class and/or cluster. In the example of FIG. 1, the electronic device 100 may be provided in a vehicle. The electronic device 100 integrated into the vehicle may include, as an image acquirer, an imaging module (e.g., a camera sensor) that captures a scene 110 around (e.g., in front of) the vehicle. However, the image acquirer is not limited to the imaging module, and may be a communicator that receives an image from an external imaging device.

The electronic device 100 may generate an input image corresponding to the scene 110 by capturing an image of the scene 110 through a camera sensor. For example, the image acquirer of the electronic device 100 may obtain the image of the scene 110 around the vehicle while the vehicle is traveling.

For example, a processor of the electronic device 100 provided in the vehicle may generate information associated with the traveling of the vehicle using the image segmentation data 120. The information associated with the traveling of the vehicle may be data used to assist in the traveling of the vehicle or used for the traveling of the vehicle, and include path guidance information, danger warning information (e.g., information on an accident such as a collision), road condition information (e.g., road congestion), and surrounding environment information (e.g., a distance map indicating distances to nearby objects). For example, the electronic device 100 may identify an object from the image segmentation data 120, calculate a distance to the identified object, and generate a distance map indicating the calculated distance to the identified object. However, examples of the information associated with the traveling are not limited thereto. The electronic device 100 may visually display the information associated with the traveling through a display. In the example of FIG. 1, the electronic device 100 may output the image segmentation data 120 to a display panel of the vehicle.

The electronic device 100 provided in the vehicle may perform autonomous driving using the image segmentation data 120. The processor of the electronic device 100 may perform one of or a combination of two or more of speed control, acceleration control, and steering control using the image segmentation data 120 while the vehicle is traveling. For example, the processor may calculate a distance to an object present nearby based on the image segmentation data 120, and perform one of or a combination of two or more of changing (e.g., increasing or decreasing) the speed of the vehicle, changing (e.g., increasing or decreasing) the acceleration of the vehicle, and changing the steering of the vehicle, based on the calculated distance to the object.

To generate the image segmentation data 120, the electronic device 100 may calculate (or obtain) a class map and a cluster map from the input image based on an image segmentation model. The class map may be a map representing a class labeled in the input image, and may be a set of elements indicating classes labeled in pixels of the input image. For example, a value of an element of a class map corresponding to one class may indicate a probability that a pixel corresponding to the element belongs to the class. The electronic device 100 may also calculate (or obtain) a class map for each of a plurality of classes. The cluster map may be a map representing a clustering result from the input image, and may be a set of elements indicating clusters mapped for pixels of the input image. For example, a value of an element of a cluster map corresponding to one cluster may indicate a probability that a pixel corresponding to the element belongs to the cluster. The class map and cluster map will be described later in detail with reference to FIG. 3.

The electronic device 100 may label a class for at least a portion or region in the input image. For example, the electronic device 100 may label a class for each pixel of the input image. The electronic device 100 may label a background class for a pixel that does not correspond to a foreground or an object. The electronic device 100 may apply a clustering result to a pixel for which a foreground class or an object class is not labeled, for example, a pixel for which the background class is labeled. As will be described later, the electronic device 100 may train a classifier layer that outputs the class map and a clustering layer that outputs the cluster map together. The electronic device 100 may train the image segmentation model such that it learns both class labeling and clustering. Thus, while classifying the input image into a limited number of classes, the electronic device 100 may perform clustering on a portion in the input image in which an object being out of an available class is shown. The electronic device 100 may dynamically generate the image segmentation data 120 even when the available classes are limited. Even when the number of object types (e.g., people, things, vehicles, animals, signs, and roads) for which recognition is required in one scene (e.g., the scene 110) during the traveling of the vehicle exceeds the number of available classes, the electronic device 100 may provide a flexible image segmentation result through the clustering layer.

The electronic device 100 may upgrade the existing image segmentation model when another class is to be added in addition to a currently available class. For example, the electronic device 100 may upgrade the image segmentation model by replacing, in the image segmentation model, the existing classifier layer with a new classifier layer having an increased number of available classes. The upgrading of the image segmentation model will be described later in detail with reference to FIG. 6.

Although the example in which the electronic device 100 using the image segmentation model is provided in the vehicle is mainly described herein, examples are not limited thereto. For another example, the electronic device 100 may be provided in an augmented reality (AR) providing device. In this example, the processor of the electronic device 100 may generate an AR content using the image segmentation data 120. The AR content may be a content provided to a user in AR and may include, for example, a content mapped to a nearby object and/or background. The electronic device 100 may calculate a distance and/or position to and/or of an identified object and/or background based on the user by using the image segmentation data 120, and generate the AR content using the calculated distance and/or position. For example, the electronic device 100 may generate the AR content (e.g., a path guidance content such as an arrow indicating a direction) having the position corresponding to the identified object (e.g., a road). The electronic device 100 may visually provide the user with the generated AR content through an AR display. The display may include a head-up display (HUD), for example. For example, the electronic device 100 may visually output the AR content to the position determined as described above.

As described above, the electronic device 100 may generate the image segmentation data 120 of objects shown in the scene 110, even though labels are not formed for all the objects shown in the scene 110 of the input image. In addition, even after the image segmentation model is provided, the electronic device 100 may perform continual learning based on a previously learned knowledge for the image segmentation model and may thus improve the cost and time efficiency of learning. Further, in continual learning, the electronic device 100 may prevent a collision between a previously learned knowledge (e.g., an existing available class) on a portion without an object class (e.g., a background class) and a new knowledge to be learned (e.g., a class to be newly added). Continual learning will be described later in detail with reference to FIG. 6.

Figure 2:
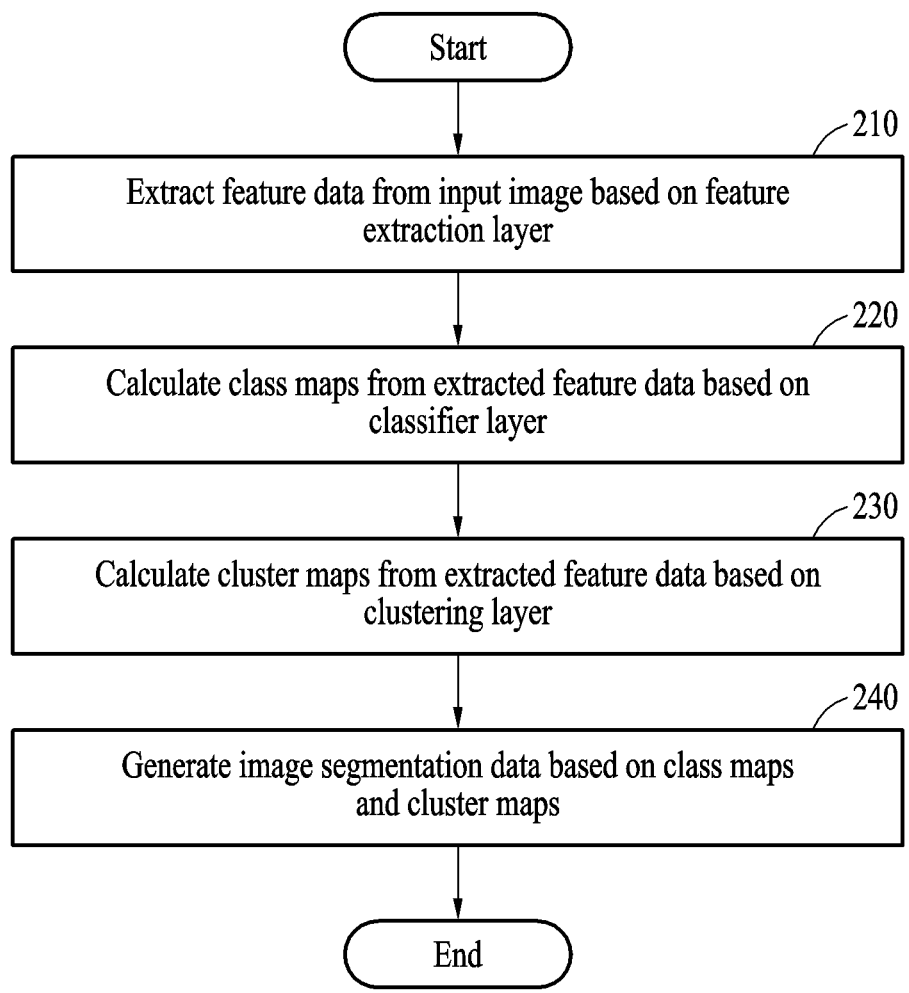
FIG. 2 illustrates an example of an image segmentation method.
Figure 3:
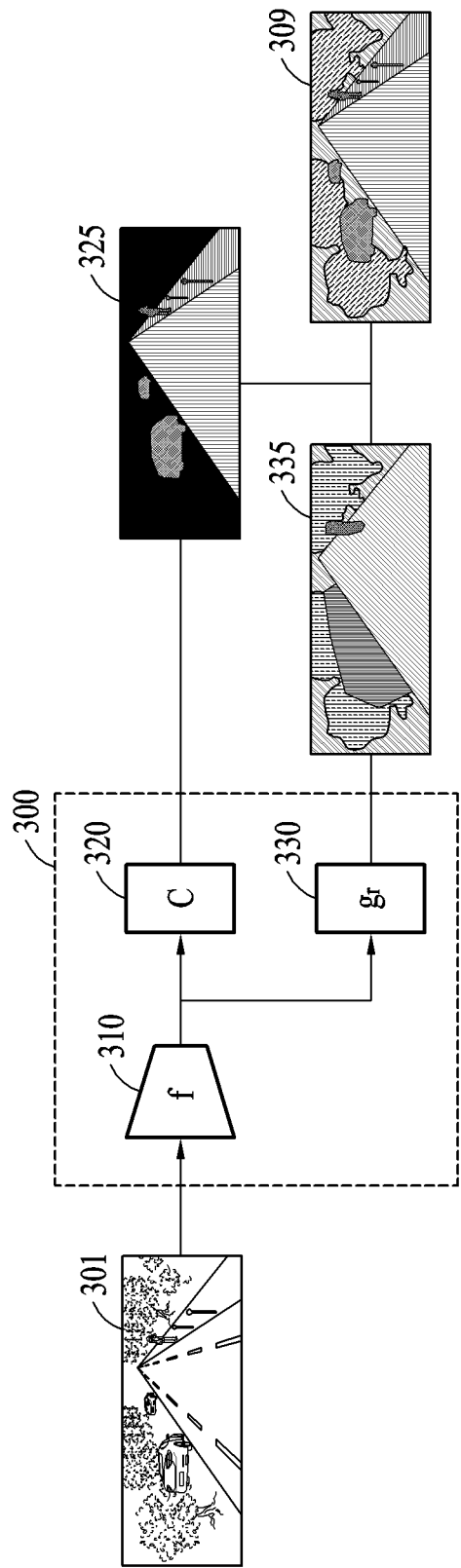
FIG. 3 illustrates an example of an image segmentation network.

FIG. 2 illustrates an example of an image segmentation method. FIG. 3 illustrates an example of an image segmentation network.

An electronic device of an example may generate a class map 325 and a cluster map 335 from an input image 301 using an image segmentation model 300. The image segmentation model 300 may be a machine learning model designed and trained to output a class map and a cluster map from an image, and may include a neural network.

The neural network may include, for example, a deep neural network (DNN). The DNN may include a fully connected network (FCN), a deep convolutional network (DCN), and a recurrent neural network (RNN). The neural network may perform object classification, object recognition, and image recognition by mapping input data and output data that are in a nonlinear relationship with each other through deep learning, and is described herein as performing mainly image segmentation. Image segmentation may be an operation of identifying a portion and/or region in an image that represents the same element (e.g., an object or background), for example, an operation (e.g., class labeling) of labeling pixels representing the same element as the same class and an operation of clustering pixels representing the same element into the same cluster. For reference, the clustering may be construed as an operation of pseudo-labeling, as an undefined class, pixels corresponding to portions and/or regions identified as representing the same element.

Deep learning may be a machine learning method used to solve a problem such as image segmentation from a big dataset, and may map input data and output data to each other through supervised or unsupervised learning. Although an example in which the neural network is trained mainly through supervised learning is described herein, examples are not limited thereto. The training will be described later in detail with reference to FIGS. 5 and 6.

The neural network of the image segmentation model 300 may be a model of a machine learning structure designed to extract feature data from input data and provide an inference operation using the extracted feature data. The feature data may be data associated with a feature abstracted from the input data (e.g., the input image 301). For example, when the input data is an image, the feature data may be data abstracted from the image and may be represented in the form of a vector, for example. In an example, the inference operation using the feature data may include class labeling and clustering. Class labeling may be an operation of labeling each pixel of the input image 301 into a class. Clustering may be an operation of clustering pixels representing the same or similar object among pixels of the input image 301 into the same cluster.

For example, the image segmentation model 300 illustrated in FIG. 3 may include a neural network, and the neural network may include a feature extraction layer 310, a classifier layer 320, and a clustering layer 330. As described above, the feature extraction layer 310 may be a layer for extracting feature data from input data and include, for example, a convolution layer for a convolution operation. The convolution layer may be a layer in which a kernel filter-based convolution operation is applied to data. The classifier layer 320 may be a layer that outputs the class map 325 from the feature data. The clustering layer 330 may be a layer that outputs the cluster map 335 from the feature data. A layer configuration of the feature extraction layer 310, the classifier layer 320, and the clustering layer 330 is not limited to a particular example, but may include various combinations of various layers including, for example, a convolutional layer, a pooling layer, a dense layer, and a fully connected layer.

As illustrated in FIG. 3, the classifier layer 320 and the clustering layer 330 may be connected as layers subsequent to the feature extraction layer 310. That is, the classifier layer 320 and the clustering layer 330 may receive extracted common feature data from the feature extraction layer 310. The classifier layer 320 and the clustering layer 330 may each include one or more layers, and each layer may include one or more nodes.

For reference, nodes of a layer may be connected to nodes of a subsequent layer of the layer through links. The number of the links may correspond to the number of the nodes included in the subsequent layer, and a weight may be set for each of the links. A link may also be referred to as a connecting line. To each node included in a layer, an output of an activation function for weighted inputs of nodes included in a previous layer may be input. A weighted input may be obtained by multiplying an input of nodes included in a previous layer by a weight of a link. A weight may also be referred to as a parameter of the neural network, and updated by training to be described later with reference to FIGS. 5 and 6. A transfer of a weighted input to a subsequent layer may be referred to as propagation. The activation function may include sigmoid, hyperbolic tangent (tanh) and rectified linear unit (ReLU), by which nonlinearity may be formed in the neural network.

Hereinafter, an image segmentation method performed using the image segmentation model 300 will be described with reference to FIG. 2 in conjunction with FIG. 3.

In operation 210, a processor of an electronic device of an example may extract feature data from an input image 301 based on a feature extraction layer 310. The electronic device may extract the feature data from the input image 301 using the feature extraction layer 310 through the data propagation described above.

In operation 220, the processor of the electronic device may calculate one or more class maps 325 from the extracted feature data based on a classifier layer 320. The electronic device may calculate (or obtain) the class maps 325 from the feature data using the classifier layer 320 through the data propagation described above. For example, the electronic device may calculate (or obtain) class maps (e.g., the class maps 325) as many as the number of available classes of the classifier layer 320. The electronic device may calculate a class map for each available class. An available class described herein may be a class that is classifiable by the classifier layer 320, and the number of available classes may indicate the number of classes distinguishable in the classifier layer 320. For example, when the number of available classes in the classifier layer 320 is N, the electronic device may calculate a class map for each of the N available classes. In this example, N may be an integer greater than or equal to 2. That is, the electronic device may calculate the N class maps (e.g., the class maps 325). For example, the number of elements in each of the class maps 325 may be the same as the number of pixels of the input image 301. A class map corresponding to one class may be a set of element values indicating probabilities that pixels of the input image 301 belong to the class.

In operation 230, the processor of the electronic device may calculate one or more cluster maps 335 from the extracted feature data based on a clustering layer 330. The electronic device may calculate the cluster maps 335 from the feature data using the clustering layer 330. For example, the electronic device may calculate (or obtain) cluster maps (e.g., the cluster maps 335) as many as the number of available clusters of the clustering layer 330. The number of available clusters may be the number of clusters that available for clustering in the clustering layer 330. For example, when the number of available clusters in the clustering layer 330 is M, the electronic device may calculate M cluster maps. In this example, M may be an integer greater than or equal to 2. For example, the number of elements in each cluster map may be the same as the number of pixels of the input image 301. A cluster map corresponding to one cluster may be a set of element values indicating probabilities that pixels of the input image 301 belong to the cluster. An object type indicated by each cluster may be unfixed, and an object type indicated by a cluster map may vary depending on a scene.

In an example, as illustrated in FIG. 3, the electronic device may separately calculate (or obtain) the class maps 325 and the cluster maps 335 using common feature data for the classifier layer 320 and the clustering layer 330.

In operation 240, the electronic device may generate image segmentation data 309 based on the class maps 325 and the cluster maps 335. The electronic device may generate the image segmentation data 309 by labeling the pixels of the input image 301 into a class based on the class maps 325 and a cluster based on the cluster maps 335. The image segmentation data 309 may be data in which the pixels of the input image 301 are segmented into classes and/or clusters to which the pixels of the input image 301 belong respectively.

For example, the electronic device may determine a class to be labeled for each pixel of the input image 301, using the class maps 325 in the input image 301. The electronic device may extract element values corresponding to the same pixel of the input image 301 in the class maps 325, and determine a class to be labeled for the pixel using the extracted element values. For example, the electronic device may extract probability values for each class with respect to each pixel of the input image 301, and label a class of a class map having a highest probability value among the extracted probability values for a corresponding pixel. However, this is merely an example, and the labeling using the class maps 325 is not limited to the foregoing operations. For reference, the electronic device may label at least a portion of the pixels of the input image 301 as an object class or a foreground class, and may label a remaining portion of the pixels as a background class.

For another example, the processor of the electronic device may exclude a clustering result that is based on the cluster maps 335 for pixels labeled based on the class maps 325 among the pixels of the image segmentation data 309. The electronic device may determine that a pixel classified as the background class in the class maps 325 belongs to a cluster corresponding to one cluster map among the cluster maps 335. That is, the electronic device may cluster the remaining pixels, excluding the pixels labeled using the class maps 325, using the cluster maps 335. The electronic device may extract element values corresponding to the same pixel of the input image 301 in the cluster maps 335 for a region classified as the background class, and determine a cluster to be labeled for the pixel using the extracted element values. For example, the electronic device may extract probability values for each cluster with respect to each pixel classified as the background class in the input image 301, and label a cluster of a cluster map having a highest probability value among the extracted probability values for a corresponding pixel. However, this is merely an example, and the labeling using the cluster maps 335 is not limited to the foregoing operations. For example, when two or more cluster maps represent a clustering result of the same or similar elements, the electronic device may temporarily merge clusters indicated by the two or more cluster maps into a single cluster. The electronic device may label the temporarily merged single cluster for pixels classified as the background class. The temporarily merged single cluster in one scene may be separated in another scene.

Instead of labeling a background including a plurality of objects as a single class, the electronic device may distinguish it into various clusters through the clustering described above. The electronic device may extract more features even from an unlabeled background portion by applying, to learning or training, information on identicalness and dissimilarity among various objects. In addition, it is possible to prepare for a background conflict in continual learning of image segmentation.

In an example, the class maps 325, the cluster maps 335, and the image segmentation data 309 may have a resolution of the input image 301. For example, the resolution of the class maps 325, the cluster maps 335, and the image segmentation data 309 may be the same as the resolution of the input image 301. The number of elements of the class maps 325, the number of elements of the cluster maps 335, and the number of elements of the image segmentation data 309 may be the same as the number of pixels of the input image 301.

Figure 4:
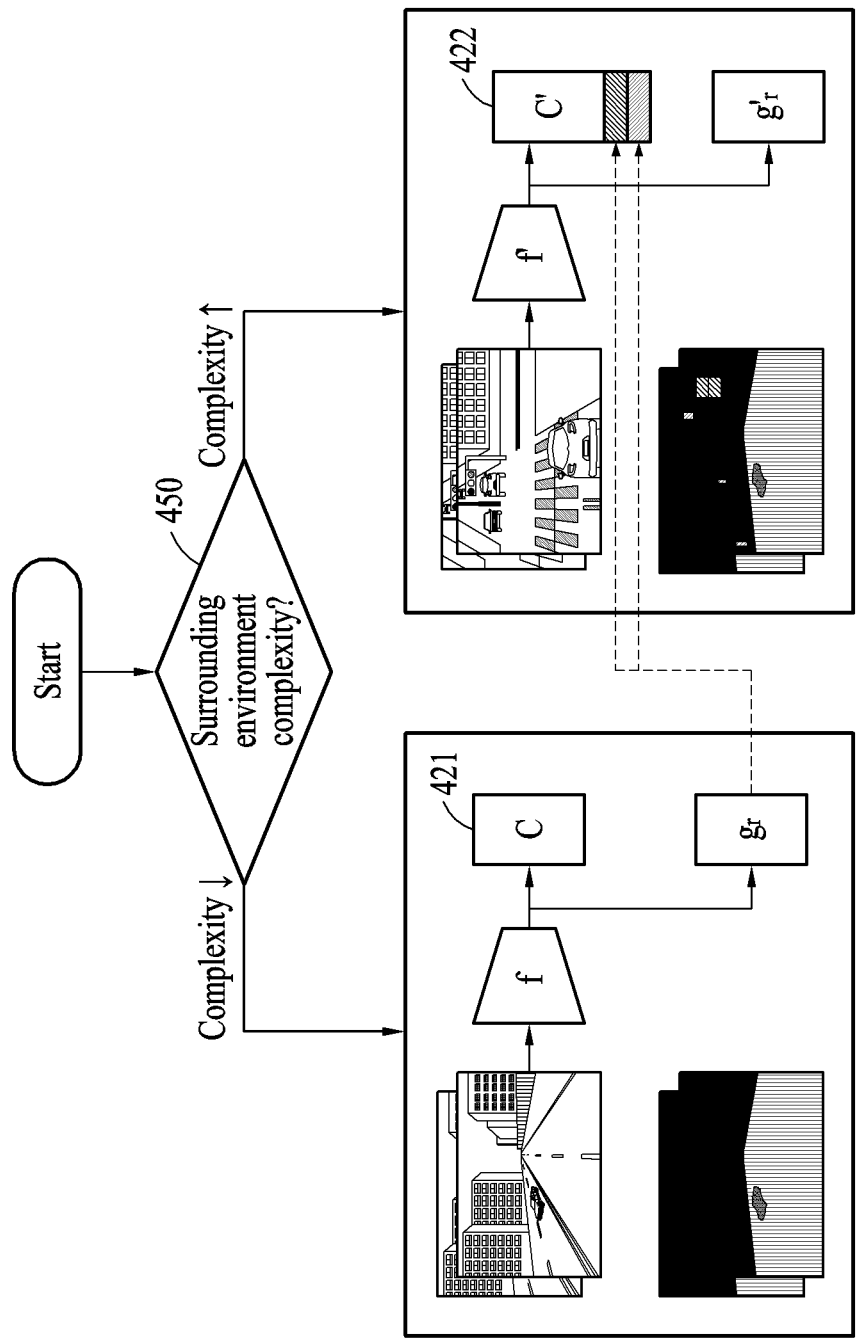
FIG. 4 illustrates an example of using a dynamic model based on a complexity of a surrounding environment.

FIG. 4 illustrates an example of using a dynamic model based on a complexity of a surrounding environment.

A processor of an electronic device of an example may select a classifier layer from among a plurality of classifier layers based on a position of the electronic device. For example, the electronic device may store the classifier layers in a memory. At least one classifier layer among the classifier layers may have available classes different from those of another classifier layer. The classifier layers may have different numbers of available classes. The electronic device may selectively use one classifier layer among the classifier layers stored in the memory based on the required number of available classes. The electronic device may estimate the position of the electronic device using a global navigation satellite system (GNSS) signal received using a GNSS module. However, the estimation of the position is not limited thereto, and the electronic device may estimate the position using a positional relationship with a base station connected through a communication module and a geographical position of an access point (AP) being connected. The required number of available classes may vary based on a complexity of a surrounding environment that is based on the position of the electronic device.

The electronic device may calculate (or obtain) one or more class maps from extracted feature data using the selected classifier layer. The electronic device may connect the selected classifier layer to a feature extraction layer. The electronic device may calculate (or obtain) a class map for each available class of the selected classifier layer by propagating feature data extracted from an input image using the feature extraction layer to the selected classifier layer.

In operation 450, the electronic device may estimate the complexity of the surrounding environment based on the position of the electronic device. The complexity of the surrounding environment may be a degree of how complex the surrounding environment of the electronic device is, and vary based on the number of types of objects that may be potentially present in the surrounding environment. That is, as the complexity of the surrounding environment increases, the required number of available classes may increase. In contrast, as the complexity of the surrounding environment decreases, the required number of available classes may decrease. For example, when the electronic device is provided in a vehicle and the vehicle enters a center of a city, the complexity of the surrounding environment of the electronic device may increase. When the vehicle moves out to the suburbs, the complexity of the surrounding environment of the electronic device may decrease. For another example, when the electronic device is provided in an AR device and the AR device moves indoors, the complexity of the surrounding environment of the electronic device may increase. When the AR device moves outdoors, the complexity of the surrounding environment of the electronic device may decrease. However, examples of the increase and decrease in the complexity of the surrounding environment is not limited to the foregoing.

For example, when the complexity of the surrounding environment increases due to a change in the position of the electronic device while the processor of the electronic device is calculating a class map using a first classifier layer 421 having a first number (e.g., 100) of available classes, the processor of the electronic device may select a second classifier layer 422 having a second number (e.g., 1000) of available classes that is greater than the first number of available classes. When the complexity of the surrounding environment decreases due to a change in the position of the electronic device while the processor of the electronic device is calculating a class map using the second classifier layer 422 having the second number of available classes, the processor of the electronic device may select the first classifier layer 421 having the first number of available classes that is less than the second number of available classes. Thus, the electronic device may selectively provide labeling that uses classifier layers having various numbers of available classes, using the same feature extraction layer. Although the first classifier layer 421 and the second classifier layer 422 have been described above, the electronic device may store two or more classifier layers. The electronic device may select a classifier layer corresponding to an estimated complexity of the surrounding environment from among the two or more classifier layers.

Although an increase or a decrease in the number of available classes of a classifier layer has been described above, examples are not limited thereto. For example, the number of available clusters of a clustering layer may also increase and/or decrease. In this example, the processor of the electronic device may select one clustering layer from among a plurality of clustering layers based on the position of the electronic device. The electronic device may connect the selected clustering layer to the feature extraction layer. The electronic device may calculate (or obtain) one or more cluster maps from extracted feature data using the selected clustering layer. Thus, the electronic device may selectively provide clustering that uses clustering layers having various numbers of available clusters, using the same feature extraction layer.

For example, when the complexity of the surrounding environment increases due to a change in the position of the electronic device while the processor of the electronic device is calculating a cluster map using a first clustering layer having a first number of available clusters, the processor of the electronic device may select a second clustering layer having a second number of available clusters that is greater than the first number of available clusters. When the complexity of the surrounding environment decreases due to a change in the position of the electronic device while the processor of the electronic device is calculating a cluster map using the second clustering layer having the second number of available clusters, the processor of the electronic device may select the first clustering layer having the first number of available clusters that is less than the second number of available clusters Although the first clustering layer and the second clustering layer have been described above, the electronic device may store two or more clustering layers. The electronic device may select a clustering layer corresponding to an estimated complexity of the surrounding environment from among the two or more clustering layers.

Although the example in which the complexity of the surrounding environment varies depending on the position of the electronic device has been mainly described above, examples are not limited thereto. For example, the electronic device may estimate the complexity of the surrounding environment by analyzing a scene of an input image.

Figure 5:
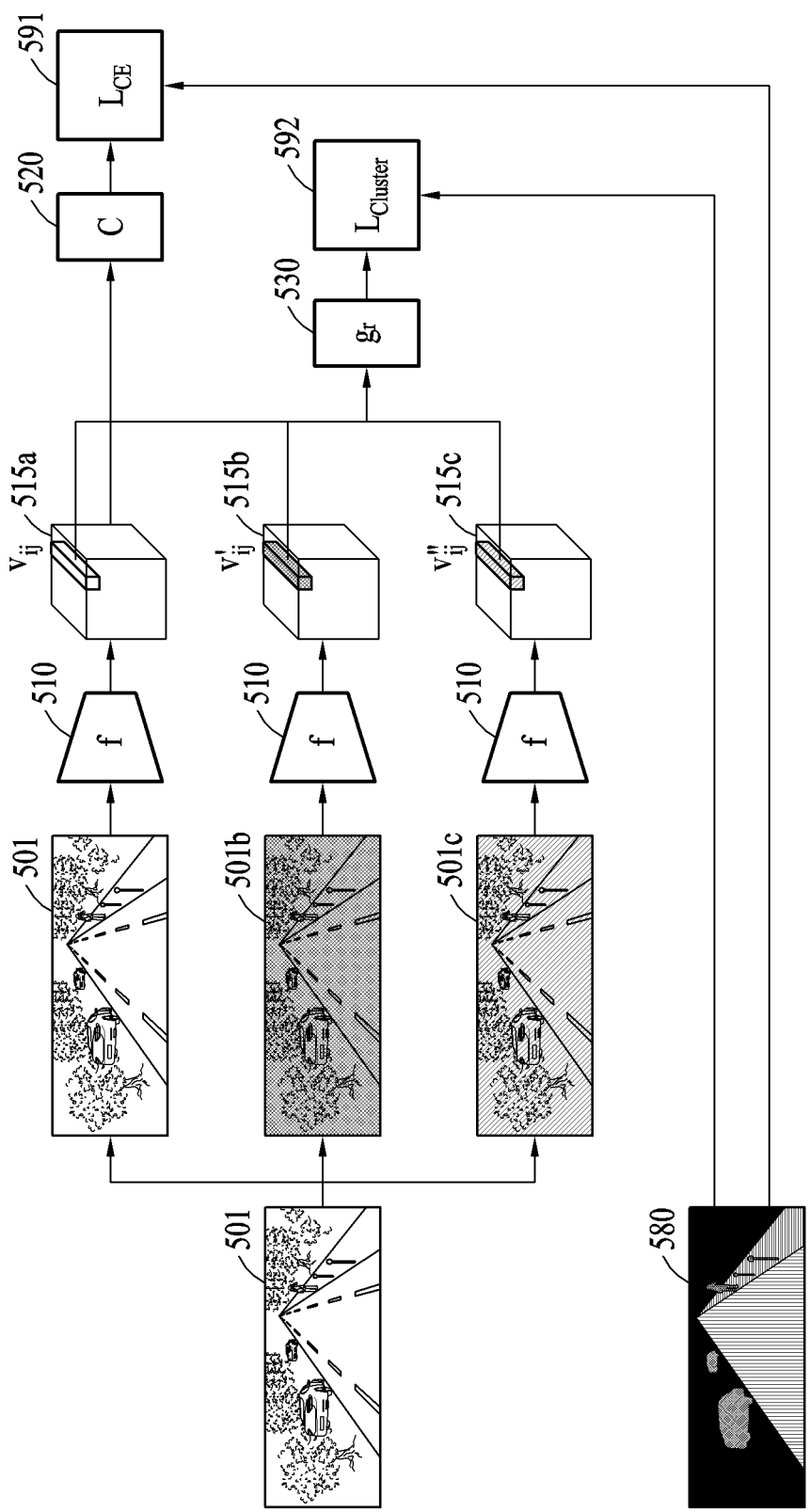
FIG. 5 illustrates an example of training an image segmentation network.
Figure 6:
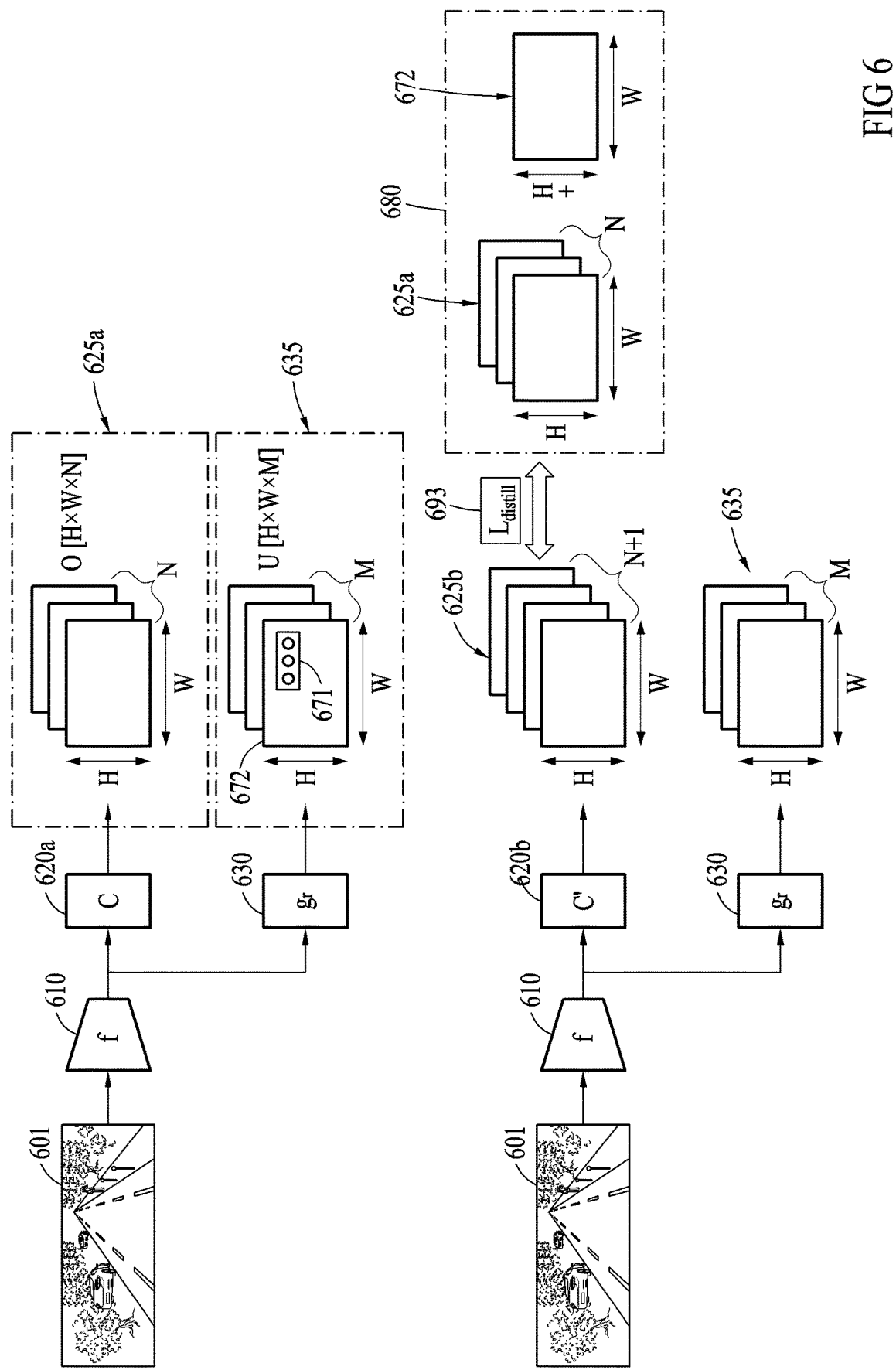
FIG. 6 illustrates an example of training an image segmentation network.

FIGS. 5 and 6 illustrate examples of training an image segmentation network.

A processor of an electronic device of an example may update one of or a combination of two or more of a feature extraction layer 510, a classifier layer 520, and a clustering layer 530 based on training data. For example, the training data may be collected during a movement of the electronic device, but the process is not limited thereto. The training data may include a pair of a training input (e.g., a training image 501) and a ground truth label map 580. The ground truth label map 580 may be a map in which a class to which individual pixels of the training image 501 belongs is labeled. A portion shown as unlabeled in the example of FIG. 5 may be a portion in which a background class is labeled. That is, a portion in which an object class is unlabeled may be labeled as the background class.

The processor of the electronic device may update a parameter of the classifier layer 520 based on a first loss 591 between a ground truth label of the collected training data and one or more class maps calculated from the classifier layer 520. For example, the electronic device may calculate first feature data 515a by propagating the training input to the feature extraction layer 510. The electronic device may calculate a temporary class map by propagating the first feature data 515a to the classifier layer 520. The temporary class map may be generated for each available class of the classifier layer 520. The electronic device may calculate, as the first loss 591, a cross-entropy loss $L_{CE}$ between the temporary class map and the ground truth label map 580.

The processor of the electronic device may update a parameter of the clustering layer 530 using a second loss 592 calculated based on the training image 501 of the collected training data and an image augmented from the training image 501. The electronic device may generate an image set ($I_n$, $I_n'$, $I_n''$) to which various augmentation methods are applied to the training image 501.

For example, the electronic device may generate a first augmented image 501b and a second augmented image 501c by augmenting the training image 501. The electronic device may generate an augmented image by emphasizing one color component in the training image 501. For example, the first augmented image 501b may be an image in which a green component is emphasized, and the second augmented image 501c may be an image in which a blue component is emphasized. However, an augmentation method is not limited to such a color change, and other various image augmentation methods including changing a color tone and/or brightness or preserving a shape component such as an edge of an image may also be used. The electronic device may calculate feature data corresponding to each image by individually propagating the training image 501, the first augmented image 501*b*, and the second augmented image 501*c* to the feature extraction layer 510. For example, as illustrated in FIG. 5, first feature data 515*a* may be data extracted from the training image 501, second feature data 515*b* may be data extracted from the first augmented image 501*b*, and third feature data 515*c* may be data extracted from the second augmented image 501*c*. Although it is illustrated that two additional images are augmented in FIG. 5, the number of augmented images is not limited thereto.

The electronic device may calculate a cluster map corresponding to each feature data by individually propagating the first feature data 515*a*, the second feature data 515*b*, and the third feature data 515*c* to the clustering layer 530. For example, the electronic device may generate a first temporary cluster map calculated from the first feature data 515*a*, a second temporary cluster map calculated from the second feature data 515*b*, and a third temporary cluster map calculated from the third feature data 515*c*. The electronic device may calculate the second loss 592 using temporary cluster maps generated from an original image (e.g., the training image 501) and augmented images. For example, the electronic device may calculate, as the second loss 592, a loss $L_{cluster}$ corresponding to a difference among the first temporary cluster map, the second temporary cluster map, and the third temporary cluster map. A difference between temporary cluster maps may include, for example, a difference between vectors each indicating a cluster probability for each pixel, and a difference between data obtained by transforming the vectors (e.g., data obtained by normalizing or transforming vector values). A vector representing a cluster probability for each pixel may be a 1×1×M dimensional vector having, as an element, a probability that each pixel belongs to each cluster for each of W×H pixels in a W×H×M-dimensional cluster map.

The electronic device may update parameters of layers of an image segmentation model, using a total loss that is based on the first loss 591 and the second loss 592. For example, the electronic device may update the parameters until the total loss is less than a threshold value while backpropagating the total loss. The electronic device may update the parameters based on a gradient descent method. However, examples are not limited thereto, and the electronic device may repeat updating the parameters until the total loss converges. The total loss may be, but is not limited to, a weighted sum of the first loss 591 and the second loss 592.

The electronic device may train the image segmentation model such that the first loss 591 is reduced, and thereby train the classifier layer 520 with label information of the ground truth label map 580. The electronic device may train the image segmentation model such that the second loss 592 is reduced, and thereby update a parameter of the clustering layer 530 such that the same or similar clusters are formed from pixel-wise feature vectors $V_{ij}$, $V_{ij}'$, and $V_{ij}'$ of each image extracted from the feature extraction layer 510. That is, through training using the second loss 592, the electronic device may group together pixels representing the same or similar objects and/or background in an input image.

Thus, the electronic device may label a cluster for a pixel for which a class is unlabeled by training the parameters of the classifier layer 520 and the clustering layer 530 in time series or in parallel. Accordingly, even when only some classes in a training image are labeled (annotated), the electronic device may efficiently perform training. For reference, the second loss 592 of FIG. 5 may be an example clustering loss, and a loss used for training the clustering layer 530 is not limited thereto.

FIG. 6 illustrates an example of training performed when a target class increases while a classifier layer is being upgraded.

For example, through training in a similar way described above with reference to FIG. 5, an electronic device of an example may update parameters of a feature extraction layer 610, a classifier layer 620*a*, and a clustering layer 630. For example, the number of available classes of the classifier layer 620*a* may be N including, for example, a road, a sidewalk, a vehicle, and a background (N=4). After the training described above is completed for a current available class, an available class may be added.

A processor of the electronic device may train the previously constructed classifier layer 620*a* and a new classifier layer 620*b* including a layer corresponding to a class to be added, based on collected training data. The electronic device may combine a cluster map 672 corresponding to a new label (e.g., a traffic light) among cluster maps calculated using a previously trained image segmentation model and an output of a previously constructed classifier layer (e.g., the classifier layer 620*a*) to generate new ground truth class data 680 and collect it as training data.

For example, the processor of the electronic device may obtain a clustering result corresponding to a class to be added from one or more cluster maps calculated by the previously constructed clustering layer 630.

In the example of FIG. 6, the electronic device may generate cluster maps U as many as the number of available clusters using the clustering layer 630. An input image 601 may have a resolution of H×W, in which H denotes the number of pixels corresponding to the height and W denotes the number of pixels corresponding to the width. The electronic device may generate cluster maps of H×W as many as M available clusters. A set of cluster maps may also be represented as cluster data U, and U [H×W×M] may represent cluster data 635 including the cluster maps of H×W as many as the M available clusters. Similarly, the electronic device may generate class maps as many as the number of available classes by using a classifier layer. For example, the electronic device may generate class maps of H×W as many as N available classes. In this example, N and M may each be an integer greater than or equal to 1. A set of class maps may also be represented as class data O, and O [H×W×N] may represent class data 625*a* including the class maps of H×W as many as the N available classes.

The electronic device may select the cluster map 672 corresponding to the class to be added from among one or more cluster maps. For example, the electronic device may extract probabilities (e.g., cluster probabilities) that a pixel 671 corresponding to the class to be added among pixels labeled as a background class belong to each cluster. The electronic device may determine, as a cluster corresponding to the class to be added, a cluster of the cluster map 672 indicating the highest cluster probability among the cluster probabilities of the pixel 671 corresponding to the class to be added. However, examples are not limited thereto, and the electronic device may determine, as the cluster corresponding to the class to be added, clusters having probability values in a preset upper rank in descending order with respect to the pixel 671 corresponding to the class to be added. For example, the electronic device may select the cluster map 672 in which the pixel 671 corresponding to a traffic light, which is the class to be added, has a high probability from among the M cluster maps. For example, the pixel 671 corresponding to the class to be added in the image may be set by a user and/or an expert. Since only the class to be added needs to be annotated, the cost of constructing a dataset may be reduced.

The electronic device may update a parameter of the new classifier layer 620*b* based on a third loss between an obtained clustering result and a class map calculated using the new classifier layer 620*b*. For example, the electronic device may calculate new class data 625*b* by propagating the feature data extracted through the feature extraction layer 610 to the new classifier layer 620*b*.

The new class data 625*b* may include N+1 class maps corresponding to the existing N available classes and an available class to be newly added. In the example of FIG. 6, the N+1 class maps of H×W may be generated. However, this is merely an example in which one available class is added. For another example, when k available classes are added, N+k new class maps may be generated. In this example, k may be an integer greater than or equal to 1. The electronic device may combine the class data 625*a* O [H×W×N] which is an output of the previous classifier layer 620*a* and the cluster map 672 corresponding to the class to be added, to generate the new ground truth class data 680 O' [H×W× (N+1)].

The electronic device may calculate, as a third loss 693, a loss (e.g., a distillation loss $L_{distill}$) between an output of the new classifier layer 620*b* and the new ground truth class data 680 O' [H×W× (N+1)]. The electronic device may calculate the third loss 693 only for the pixel 671 corresponding to a portion (e.g., a traffic light) corresponding to the class to be added in the new ground truth class data 680 O' [H×W× (N+1)] and the class data 625*b* which is an output of the new classifier layer 620*b*, excluding a remaining portion from the calculation of the third loss 693. The electronic device may iteratively update a parameter of the new classifier layer 620*b* such that the third loss 693 is reduced. When the update based on the third loss 693 is completed, an initial parameter of the new classifier layer 620*b* may be set. In addition, the electronic device may calculate a total loss by calculating e a sum of a first loss (e.g., the first loss 591 of FIG. 5), a second loss (e.g., the second loss 592 of FIG. 5), and the third loss 693, and iteratively train at least one layer of the image segmentation model until the total loss is reduced to a threshold or converges. Thus, using the third loss 693, the electronic device may reduce a learning (or training) time, reduce a required resource, and prevent deterioration of learning (or training) that may occur due to a collision between a newly added class and a previously learned background. The electronic device may use only a label for a class to be added, enabling continual learning while maintaining a learned knowledge of a previous class.

Although the example of using an output of the previously constructed classifier layer 620*a* for a previously constructed available class among available classes of the new classifier layer 620*b* has been described above, examples are not limited thereto. The electronic device may calculate the third loss 693 by using an output of the previously constructed clustering layer 630 only for a newly added available class and using a prepared ground truth label map for an existing available class.

The electronic device may perform an update while maintaining parameters of the feature extraction layer 610 and the clustering layer 630 and replacing a previous one (e.g., the classifier layer 620*a*) with the new classifier layer 620*b*. However, the process is not limited thereto, and the electronic device may update all the parameters of the feature extraction layer 610, the clustering layer 630, and the new classifier layer 620*b*. In this case, the number of available clusters of the clustering layer 630 may be reduced by the number of added classes. For example, when the number of available classes of the new classifier layer 620*b* is N+k, the electronic device may change the image segmentation model to have a new clustering layer having M−k available clusters.

Figure 7:
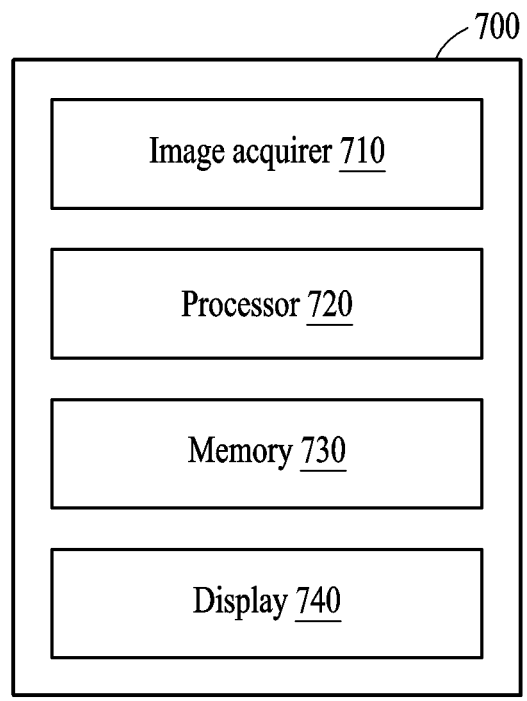
FIG. 7 illustrates an example of an electronic device.

FIG. 7 illustrates an example of an electronic device.

Referring to FIG. 7, an electronic device 700 may include an image acquirer 710, a processor 720, a memory 730, and a display 740.

The image acquirer 710 may obtain an image of a scene around the electronic device 700. In an example, the image acquirer 710 may obtain a scene around (e.g., in front) of a device (e.g., a vehicle and/or an AR device) in which the electronic device 700 is provided. For example, the image acquirer 710 may include an imaging module that generates an image by capturing an image of such a surrounding scene. The image acquirer 710 may include a camera sensor, a light detection and ranging (lidar) sensor, a radio detection and ranging (radar) sensor, and an ultrasonic sensor. For example, the electronic device 700 may generate a color image through sensing data of the camera sensor. For example, the electronic device 700 may generate a lidar image through sensing data of the lidar sensor. For example, the electronic device 700 may generate a radar scan image through sensing data of the radar sensor. For example, the electronic device 700 may generate an ultrasonic image through sensing data of the ultrasonic sensor. However, the configuration is not limited thereto, and the image acquirer 710 may include a communicator. For example, the communicator of the electronic device 700 may receive an image from another imaging device disposed outside the electronic device 700 by wire and/or wirelessly.

The processor 720 may extract feature data from an input image based on a feature extraction layer. The processor 720 may calculate (or obtain) one or more class maps from the extracted feature data based on a classifier layer. The processor 720 may calculate (or obtain) one or more cluster maps from the extracted feature data based on a clustering layer. The processor 720 may generate image segmentation data based on the class maps and the cluster maps. However, operations of the processor 720 are not limited thereto, and the processor 720 may also perform the operations described above with reference to FIGS. 1 through 6.

The memory 730 may temporarily or permanently store data required for image segmentation. For example, the memory 730 may store therein the input image, training data, an image segmentation model, the feature extraction layer, the classifier layer, the clustering layer, a parameter of each layer, and an inference result (e.g., image segmentation data).

The display 740 may visually output the image segmentation data. For example, the display 740 of the electronic device 700 provided in a vehicle may visually display information associated with traveling of the vehicle that is generated using the image segmentation data. The vehicle may be an autonomous vehicle or a vehicle supporting advanced driver-assistance systems (ADAS).

For another example, the display 740 of the electronic device 700 provided in an AR providing device may visually provide a user with an AR content generated using the image segmentation data.

In an example, the electronic device 700 may maintain a knowledge of a previously learned class when adding a new class, by performing training and inference using both the classifier layer and the clustering layer. In addition, the electronic device 700 may train the feature extraction layer such that it outputs significant and rich feature vectors even for unlabeled pixels (e.g., background) in addition to labeled pixels.

The electronic device 700 may also be applied to devices for content-based image retrieval, machine vision, medical imaging, video surveillance, and the like that use image segmentation, in addition to the vehicle and the AR device.

The electronic device 700 may perform continual learning that enables sequential adaptation to training data that changes in various ways without a need to retrain a network with all the training data. The electronic device 700 may perform annotation and training only on a newly added class, and it is thus possible to reduce the cost and time used. In addition, the electronic device 700 may perform clustering on a background, and may thus provide a pseudo-labeling result even for an unlabeled portion. Through distillation loss-based learning, it is possible to prevent a knowledge conflict between a previously learned background portion and a portion corresponding to a newly added class in a learning or training process.

The electronic device, and other devices, apparatuses, units, modules, and components described herein with respect to FIGS. 1 and 3-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computer.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An electronic device comprising:
   an image acquirer configured to obtain an input image; and
   a processor configured to extract feature data from the input image based on a feature extraction layer, calculate one or more class maps from the feature data based on a classifier layer, calculate one or more cluster maps from the feature data based on a clustering layer, and generate image segmentation data based on the one or more class maps and the one or more cluster maps,
   wherein the processor is configured to:
   exclude a clustering result that is based on the one or more cluster maps, for a pixel labeled based on the one or more class maps among pixels of the image segmentation data.

2. The electronic device of claim 1, wherein the processor is configured to:
   generate the one or more class maps, the one or more cluster maps, and the image segmentation data to have a resolution of the input image.

3. The electronic device of claim 1, wherein the processor is configured to:
   determine a pixel classified into a background class in the one or more class maps as being comprised in a cluster corresponding to one of the one or more cluster maps.

4. The electronic device of claim 1, wherein the processor is configured to:
   select the classifier layer from among a plurality of classifier layers based on a position of the electronic device.

5. The electronic device of claim 1, wherein the processor is configured to:
   in a case in which a complexity of a surrounding environment increases due to a change in a position of the electronic device while calculating the class maps using a first classifier layer having a first number of available classes, select a second classifier layer having a second number of available classes that is greater than the first number of available classes.

6. The electronic device of claim 1, wherein the processor is configured to:
   in a case in which a complexity of a surrounding environment decreases due to a change in a position of the electronic device while calculating the one or more class maps using a second classifier layer having a second number of available classes, select a first classifier layer having a first number of available classes that is less than the second number of available classes.

7. The electronic device of claim 1, wherein the processor is configured to:
   select the clustering layer from among a plurality of clustering layers based on a position of the electronic device.

8. The electronic device of claim 1, wherein the processor is configured to:
   in a case in which a complexity of a surrounding environment increases due to a change in a position of the electronic device while calculating the one or more cluster maps using a first clustering layer having a first number of available clusters, select a second clustering layer having a second number of available clusters that is greater than the first number of available clusters.

9. The electronic device of claim 1, wherein the processor is configured to:
   in a case in which a complexity of a surrounding environment decreases due to a change in a position of the electronic device while calculating the one or more cluster maps using a second clustering layer having a second number of available clusters, select a first clustering layer having a first number of available clusters that is less than the second number of available clusters.

10. The electronic device of claim 1, wherein the processor is configured to:
    update one of or a combination of two or more of the feature extraction layer, the classifier layer, and the clustering layer, based on training data collected during a movement of the electronic device.

11. The electronic device of claim 10, wherein the processor is configured to:
    update a parameter of the classifier layer based on a loss between a ground truth label of the training data and the one or more class maps calculated from the classifier layer.

12. The electronic device of claim 10, wherein the processor is configured to:
    update a parameter of the clustering layer using a loss calculated based on a training image of the training data and an image augmented from the training image.

13. The electronic device of claim 10, wherein the processor is configured to:
    train a previously constructed classifier layer and a new classifier layer comprising a layer corresponding to a class to be added, based on the training data.

14. The electronic device of claim 13, wherein the processor is configured to: obtain another clustering result corresponding to the class to be added from one or more cluster maps calculated by a previously constructed clustering layer; and
    update a parameter of the new classifier layer based on a loss between the other clustering result and a class map calculated using the new classifier layer.

15. A vehicle, comprising:
the electronic device of claim 1,
wherein the image acquirer is configured to:
obtain the input image of a surrounding scene around the vehicle while the vehicle is traveling, and
the processor is configured to:
generate information associated with the traveling of the vehicle using the image segmentation data and visually display the information associated with the traveling through a display.

16. The electronic device of claim 15, wherein the processor is configured to:
perform one of or a combination of two or more of speed control, acceleration control, and steering control of the vehicle while the vehicle is traveling, using the image segmentation data.

17. An augmented reality (AR) device, comprising:
the electronic device of claim 1,
wherein the processor is configured to:
generate an AR content using the image segmentation data and visually provide the AR content to a user through an AR display.

18. A processor-implemented method comprising:
extracting feature data from an input image based on a feature extraction layer;
calculating one or more class maps from the extracted feature data based on a classifier layer;
calculating one or more clustering maps from the extracted feature data based on a clustering layer; and
generating image segmentation data based on the one or more class maps and the one or more cluster maps,
wherein the method further comprises:
exclude a clustering result that is based on the one or more cluster maps, for a pixel labeled based on the one or more class maps among pixels of the image segmentation data.

19. A non-transitory computer-readable storage medium storing instructions that, when executed by a processor, cause the processor to perform the method of claim 18.

20. An electronic device comprising:
one or more processors configured to:
obtain input data;
extract feature data from the input data based on a feature extraction layer;
select a classifier layer and a clustering layer based on a physical location of the electronic device;
generate one or more class maps from the feature data based on the classifier layer;
generate one or more cluster maps from the feature data based on the clustering layer; and
generate segmentation data related to the input data based on the one or more class maps and the one or more cluster maps,
wherein the one or more processors are configured to:
exclude a clustering result that is based on the one or more cluster maps, for a pixel labeled based on the one or more class maps among pixels of the image segmentation data.

21. The electronic device of claim 20, wherein the input data is image data related to a surrounding of the electronic device.

22. The electronic device of claim 20, wherein the one or more processors are configured to generate the one or more class maps and the one or more cluster maps using a machine learning model.

23. The electronic device of claim 22, wherein the machine learning model includes a neural network.

* * * * *